(No Model.)
G. H. COLLINS.
LEVELING ROD.
No. 579,555.  Patented Mar. 23, 1897.
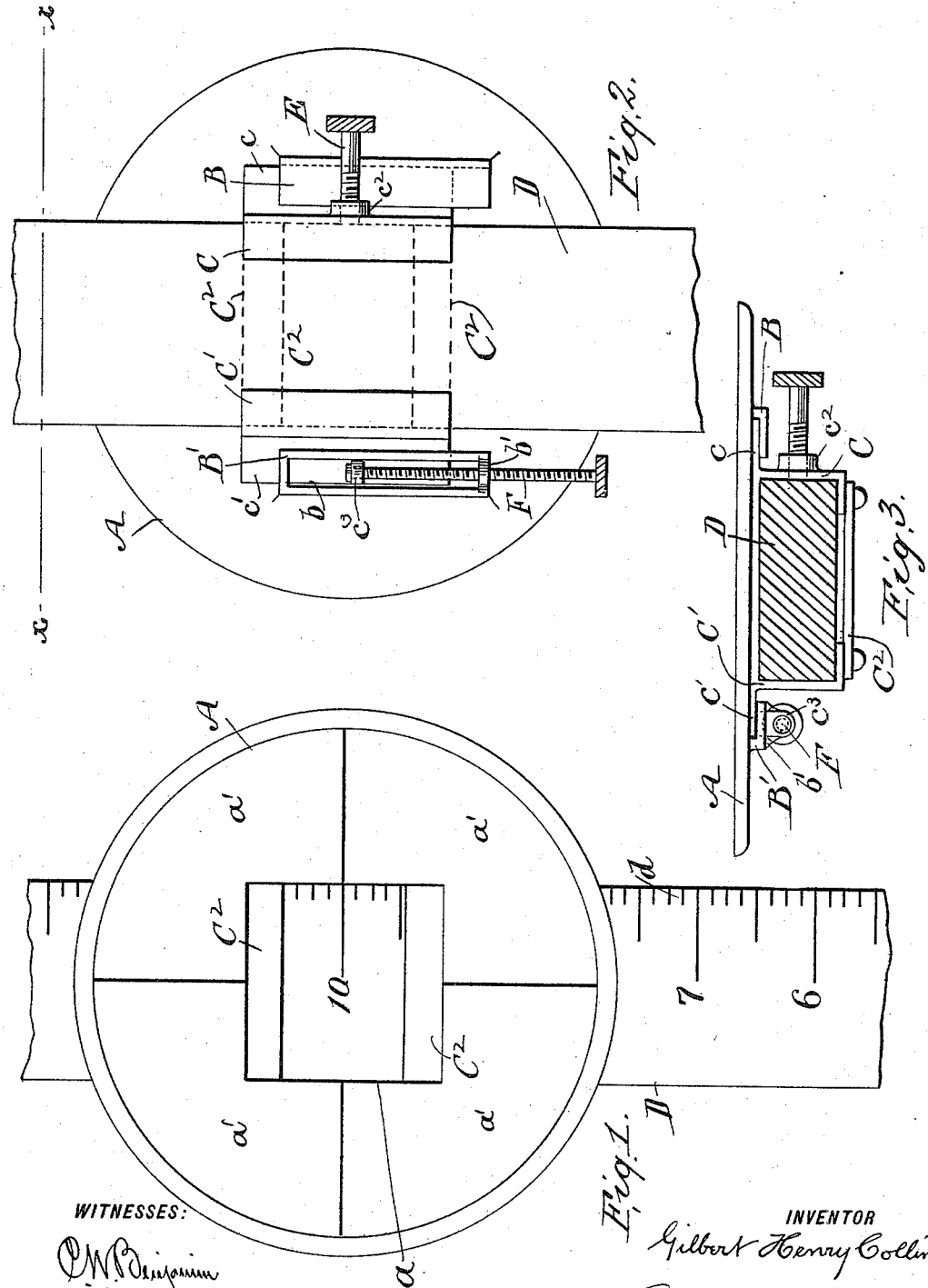
WITNESSES:
INVENTOR
Gilbert Henry Collins
BY
ATTORNEYS

UNITED STATES PATENT OFFICE.

GILBERT HENRY COLLINS, OF PITTSTON, PENNSYLVANIA.

LEVELING-ROD.

SPECIFICATION forming part of Letters Patent No. 579,555, dated March 23, 1897.

Application filed February 4, 1896. Serial No. 578,008. (No model.)

*To all whom it may concern:*

Be it known that I, GILBERT HENRY COLLINS, a citizen of the United States, and a resident of Pittston, county of Luzerne, and State of Pennsylvania, have invented certain new and useful Improvements in Leveling-Rods, of which the following is a specification, reference being had to the accompanying drawings, forming a part thereof, in which similar letters of reference indicate corresponding parts.

This invention relates to improvements in leveling-rods, and has for its object to provide an efficient and accurate means for adjusting the target thereof.

The invention will be hereinafter fully described, and specifically set forth in the annexed claim.

In the accompanying drawings, forming part of this specification, Figure 1 is a vertical front elevation of my improved device. Fig. 2 is a vertical rear elevation thereof, and Fig. 3 is a sectional plan view on a line $x\,x$ of Fig. 2.

In the practice of my invention an ordinary target A is provided upon its rear surface with two angular bearings B and B'. These said bearings engage with flanges $c$ and $c'$ of sliding angular supports C and C', which supports are adapted to move or slide vertically within the bearings B and B', and they are held together by means of cross-pieces $C^2$, which are attached by screws to said supports or slides C and C', whereby a strong structure is provided which is adapted to slide vertically upon the rod or pole D.

The slide C is provided upon its face with an integral projection $c^2$, and through this projection is threaded a thumb-screw E, which is adapted to bear upon the side surface of the rod D. The opposite bearing or slide C' is provided upon its flange $c'$ with a rearwardly-projecting lug $c^3$, which said lug passes through and operates vertically within a slot $b$ of the bearing B'. This said bearing is provided at its lower edge with a rearwardly-projecting lug $b'$, through which lug is threaded a vertically-adjustable screw F, which screw is journaled at its upper end with the lug $c^3$ of the slide C'.

The target A is provided through its face with the customary opening $a$ and the registering segments $a'$, and the pole D has the ordinary scale $d$ upon the face thereof.

In the operation of the device the target A is adjusted vertically upon the rod D to an approximately correct position. It is then fastened by tightening the thumb-screw E. Then to secure an exact and accurate adjustment the said target is operated vertically by means of the screw F.

Having thus described my invention, what I claim as new, and desire to secure by Letters Patent, is—

A surveyor's target A, provided upon its rear surface with the two angular bearings $c$, $c'$ of angular supports C, C', adapted to slide vertically within bearings B, B' and which are held together by cross-pieces $C^2$, connecting slides C, C', the whole adapted to slide upon rod D; lug $c^3$ upon the flange $c'$ of slide C', which lug passes through and operates in a vertical slot $b$, of bearing B', said bearing having a rearwardly-projecting lug $b'$ at its lower edge through which is threaded a vertically-adjustable screw F, journaled at its upper end with lug $c^3$, of slide C, substantially as shown and described.

In testimony that I claim the foregoing as my invention I have signed my name, in presence of two witnesses, this 1st day of February, 1896.

GILBERT HENRY COLLINS.

Witnesses:
EUGENE SPENCER,
OSCAR GAINES DAMAN.